Aug. 11, 1942.    R. R. CURTIS    2,292,993
BOOSTER PUMP FOR AIRCRAFT FUEL SYSTEMS
Filed Aug. 10, 1940    2 Sheets-Sheet 2
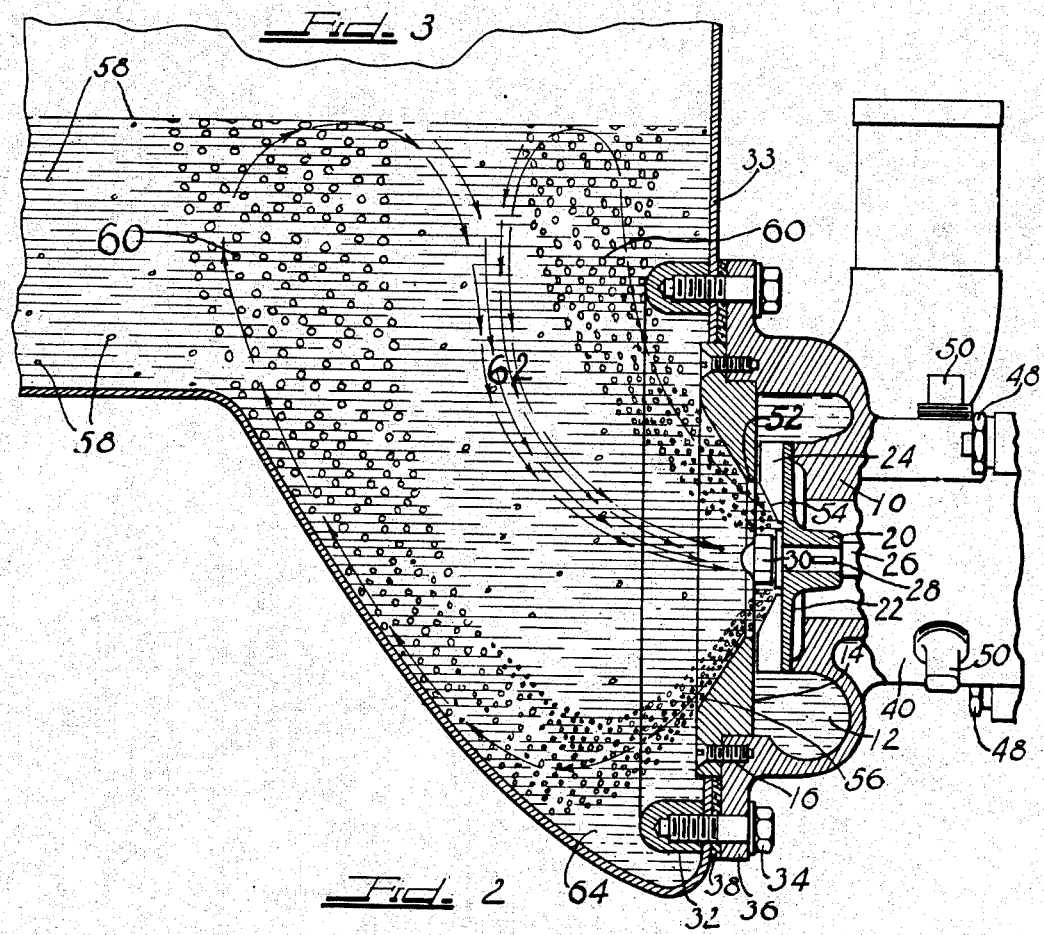
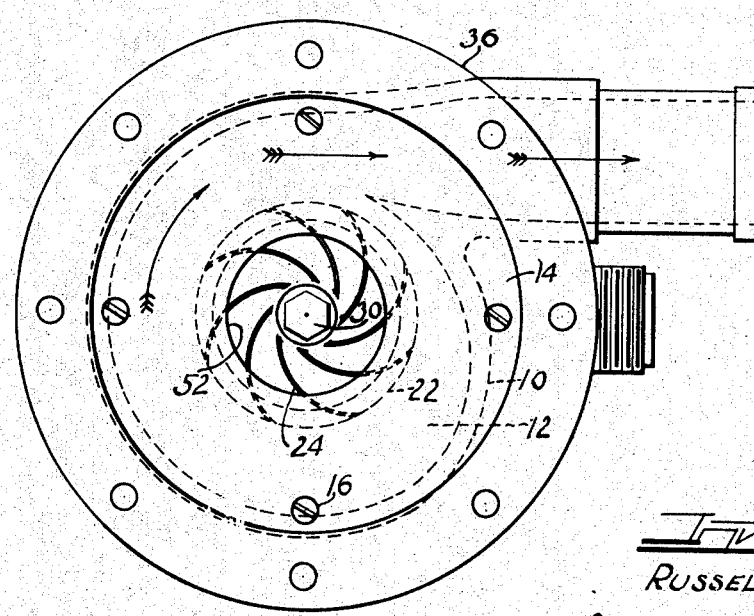
Inventor
RUSSELL R. CURTIS Patented Aug. 11, 1942

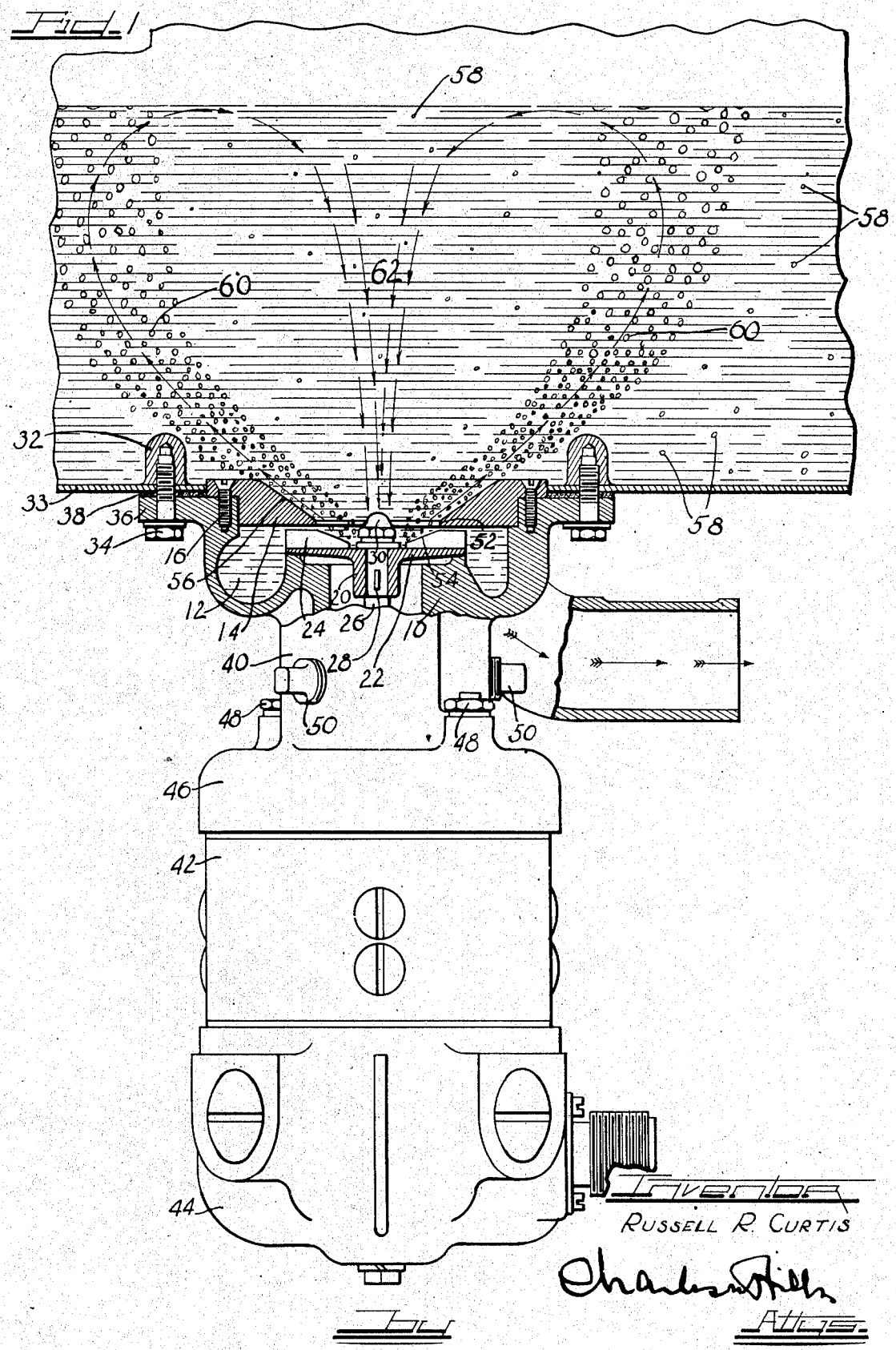

2,292,993

UNITED STATES PATENT OFFICE 2,292,993

BOOSTER PUMP FOR AIRCRAFT FUEL SYSTEMS

Russell R. Curtis, Dayton, Ohio, assignor to Curtis Pump Company, Dayton, Ohio, a corporation of Ohio Application August 10, 1940, Serial No. 352,064

14 Claims. (Cl. 103—113)

REISSUED
APR 2 1946

This invention relates to high altitude fuel systems for aircraft and particularly to a booster pump for use in connection therewith.

In the operation of aircraft with gasoline as the fuel, it is well known that, as the atmospheric pressure drops with increase in altitude, a point is finally reached where air and fixed gases in solution start to evolve and lighter constituents in the fuel to vaporize, until the engine fuel pump is no longer capable of delivering fuel in a fully liquid form to the engine. This condition frequently gives rise to what is known in the art as "vapor lock." The agitation of the fuel by the engine pump serves to aggravate the difficulties that may be experienced by accelerating the separation of the air, or other fixed gases, or vapors from the liquid fuel.

Where, as is usual in aircraft design, the fuel tank is considerably below the level of the engine and its carburetor, the pressure at the inlet side of the engine fuel pump drops still lower than the atmospheric pressure on the fuel in the tank, due to the suction head at the engine pump inlet.

Even where the amount of elevation of the engine above the fuel tank is of little consequence, the suction line is usually of considerable length and, due to weight restrictions, of small diameter, so that a considerable equivalent suction head is created at the inlet side of the engine pump.

The result of the foregoing conditions is that the fuel starts breaking into vapor at the engine pump inlet at considerably lower altitude than it does in the fuel tank, and much inventive effort has been expended, in attempts to overcome this difficulty.

In the specification of my copending application, Serial No. 324,658, filed March 18, 1940, it is proposed to employ a booster pump, placed anywhere below the hydraulic gradient in the suction line, with means to bring it into action to raise the pressure in the suction line before an altitude has been reached where the fuel would ordinarily boil at the engine pump inlet.

But while this addition of a booster pump arrangement to the fuel system, materially increases the altitude range, by boosting the pressure at the suction inlet of the engine pump where the pressure drop is greatest, so that the engine pump may deliver unbroken liquid fuel to the engine, it is obvious that, if the craft is taken to still higher altitudes, a point will ultimately be reached where the fuel will start breaking up in the fuel tank itself, and the booster pump will have difficulty in drawing fully liquefied fuel from the tank for delivery into the suction line of the engine pump.

It is therefore an object of this invention to further increase the altitude range of aircraft, by so designing the booster pump and so arranging it with respect to the fuel tank, that fully liquid fuel may be drawn from the tank considerably above the altitude at which the fuel has begun boiling in the tank.

Other objects and advantages will become evident as the invention is further described with reference to the drawings, wherein, Fig. 1 is an elevational view, partly in vertical section, of a booster pump and motor with a fragmentary portion of the fuel tank, all constructed and arranged in accordance with this invention.

Fig. 2 is a top plan view of the booster pump unit removed from the tank.

Fig. 3 is a variant form of the arrangement of the booster pump with the tank.

Like numerals refer to like parts throughout the drawings.

The booster pump is of the centrifugal type comprising a pump casing 10, provided internally with a volute 12 which does not differ materially from those of common practice. A throat member 14 covers the open side of the volute and is held to the casing by the screws 16.

The impeller comprises a hub 20, a flange 22 and a series of curved vanes 24. The impeller is secured to the motor shaft 26 by the key 28 and nut 30.

As illustrated in Fig. 1, a mounting ring 32 is secured to the inside of the lower wall of the tank 33, preferably by welding or similar means. The ring 32 is blind tapped at circumferentially spaced intervals for the screws 34 which extend through the flange 36 of the pump casing and secure the pump to the tank. A gasket 38 between the flange and tank seals against leakage.

The electric motor 40, which operates the pump, is substantially conventional, having a field ring 42 held between heads 44 and 46 by nuts 48. The upper head 46 is an integral portion of the pump casing 10 and contains a seal, not shown, to prevent leakage from the pump into the motor. One of the drain plugs 50, most conveniently located for a particular installation, may be removed and a drain pipe inserted to dispose of any leakage which may occur.

Thus far the centrifugal pump described does not differ materially from the conventional, but certain parts now to be described are particularly designed and positioned with respect to the tank to achieve a novel result.

In common practice, the diameter of the throat 52 of the member 14 is usually made the same as the diameter of the circle representing the inner ends of the vanes 24, but in the pump herein shown the circle defined by the constricted opening of the throat 52 overlies the vanes about midway of their lengths. Otherwise expressed, the circle defined by the throat opening is concentric with and lies intermediate the circles defined by the inner and outer ends of the vanes, respectively.

The inner halves of the vanes 24 which are exposed when viewed from above, as in Fig. 2, through the throat 52, are beveled off as at 54, Figs. 1 and 3, and the throat itself flares upwardly as at 56, the upper end of the flared part being substantially flush with the inside of the tank. The convergency of the throat wall 56 and the taper of the beveled edges 54 of the vanes form approximate continuations of each other.

The result of this special structure and arrangement is that there is created, immediately above the throat, a funnel-shaped whirlpool of the fuel, the particles of which rotate in the same direction as the impeller and move in corkscrew fashion toward it. This whirlpool extends well upward into the tank and is present as soon as the booster pump is put into operation.

When an altitude is reached where the fuel in the tank starts breaking up, scattered bubbles 58 will first appear throughout the tank. However, as the fuel and bubble mixture approaches the impeller, the bubbles are thrown outwardly along the tapered surface 56 of the throat member 52 and flow upwardly in the tank as indicated by the arrows in a path shown at 60. Upon approaching the surface of the fuel in the tank the bubble path widens out and the bubbles become larger until they burst at the surface of the fuel. The fuel is thus freed from the air and gases and circulates as indicated by the arrows down through the whirlpool as a substantially solid or fully liquid feed 62 to the impeller.

As a result a countercurrent circulation of fuel and bubbles is created in the tank with the bubbles rising through the fuel outwardly from the whirlpool and with fully liquid fuel being fed down through the funnel-shaped whirlpool to the impeller. The fully liquid fuel is then thrown by centrifugal force between the vanes on the impeller and the throat member where the last remaining bubbles are forced from the fuel outwardly along the path indicated at 60.

From the foregoing description it will be seen that, equipped with a booster pump of the character disclosed, aircraft may be flown to considerably higher altitudes than has heretofore been possible, for the reason that even after considerable vaporization is taking place in the fuel tank, evidenced by bubbles of vapor appearing throughout the mass, these bubbles may be separated out, and fuel in a fully liquid state put under pressure in the suction line of the engine pump.

If the throat of the booster pump were of conventional design, or if the pump were spaced further from the tank and fuel were conveyed to the vanes through a conduit of some considerable length and of unvarying diameter, or if the vane and throat proportions were conventional, vapor bubbles appearing in the fuel would be trapped and sent into the engine pump suction line in ever increasing quantities until vapor lock occurred.

In some instances, space limitations are such that the booster pump unit may not be secured to the bottom of the tank as in Fig. 1, and in such cases, the pump may be mounted as in Fig. 3, on a normally vertical end wall of the tank, by providing a sump 64 with an opening in the end wall near the bottom of the sump. The whirlpool 62 and its vortex 60 will, in this case, have a somewhat curved axis, but it has been found that separation of the vapor from the solid fuel will be almost as effective in this case as in that previously described.

The pump unit is the same in both embodiments, only its position relative to the tank is different. It should be noted, however, that in both cases, the throat of the pump is comparatively shallow and opens directly into a large mass of fuel in the tank, thus lending itself to the centrifugal separation of the bubbles of gas or vapor from the mass of liquid fuel with minimum danger of entrapping the bubbles and drawing them into the impeller.

The construction and design of the booster pump of my present invention departs from conventional centrifugal pump practice and accepts a consequent loss in efficiency in order to achieve a certain result.

The separation characteristic inherent in centrifugal pumps has been emphasized to force separation of dissolved air and fixed gases and vapor before these gases can be entrapped and passed through the pump. To accomplish this I have found it necessary to greatly reduce the throat velocity over that which is normally provided for, by increasing the inlet throat diameter and bevelling it outwardly toward the tank. As no advantage is taken of the velocity of incoming fluid, and as an abrupt change in velocity takes place as fluid reaches the impeller, efficiency is considerably lowered.

To build up a greater vortex requires the expenditure of additional energy but increased agitation is vital to successful altitude performance of this system. So the impeller vanes have been extended in toward the center of the impeller beyond the throat diameter to produce this result.

The booster described has two functions: the first to separate out bubbles of gas which form at the inlet, due to agitation of the liquid, and elsewhere in the tank; and the second to exert pressure on the engine pump suction line and prevent a further evolution of gas which might otherwise take place in the suction inlet line or in the engine pump as the fuel is further agitated.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a booster pump of the character described, a pump casing, an impeller, vanes on and radiating outwardly from the rotating axis of said impeller, and a member having a conical shaped inlet throat concentric with the axis of said impeller and its tapered end adjacent one side of said vanes, said throat being of a diameter intermediate the outside and inside diameters of the vanes, and said vanes being beveled from a point intermediate their ends inward, whereby the vanes are narrower at their inner ends.

2. In a booster pump of the character described, a pump casing, an impeller, vanes on and radiating outwardly from the rotating axis of said impeller, and a member having a conical shaped inlet throat concentric with the axis of said impeller and tapered toward and adjacent one side of said vanes, said throat being of a diameter substantially midway of the diameters of the inner and outer ends of the vanes, and said vanes being beveled from the throat diameter inward, whereby the taper of the throat and the bevel of the vanes are substantially continuations of each other.

3. In a fuel system, a fuel tank and a booster pump of the character described comprising, a pump casing, a flat disc impeller, vanes on said impeller defining therewith open ended fluid flow passages, and a throat member having one side immediately adjacent said vanes and the other side in contact with the fuel in said tank, said throat having a diameter on the vane side intermediate the inside and outside diameters of the vanes to expose an appreciable length of the vanes effective for beating out bubbles of gas or vapor from the fuel, but flaring to a larger diameter on the tank side.

4. In a fuel system, a fuel tank and a booster pump of the character described comprising, a pump casing, an impeller, tapered vanes on said impeller, and a flared throat member having one end adjacent said vanes and its other end in contact with the fuel in said tank, said throat having a diameter on the vane side substantially midway of the diameters of the inner and outer ends of the vanes, but flaring to a larger diameter on the tank side, the flare of the throat and the taper of the vanes being substantial continuations of each other.

5. In a fuel system for aircraft, a fuel tank, a centrifugal pump secured to the outside of said tank, said pump comprising, a pump casing, an impeller, vanes on said impeller, and a throat member having one side adjacent said vanes and the other side facing toward the fuel in said tank, the throat in said member having a diameter on the vane side intermediate the inside and outside diameters of the vanes, but flaring to a larger diameter on the tank side, and said vanes being beveled from a point intermediate their ends inward, whereby said vanes are narrower at their inner ends.

6. In a fuel system for aircraft, a fuel tank, a centrifugal pump secured to the outside of said tank, said pump comprising, a pump casing, an impeller, vanes on said impeller, and a shallow throat member having one side facing said vanes and the other side facing the fuel in said tank, the throat in said member having a diameter on the vane side substantially midway of the inside and outside diameters of the vanes, but flaring to a larger diameter on the tank side, and said vanes being tapered from the point adjacent the throat diameter to their inner ends, whereby said vanes are narrower at the inner ends.

7. A booster pump for attachment to a fuel tank, said pump comprising an impeller having vanes extending outwardly from the axis of said impeller, said vanes terminating at their inner and outer ends on circles concentric with said axis to provide fluid flow passages therebetween, and a member overlying and spaced from said impeller on the tank side in closely spaced relation to the vanes and having a shallow inlet throat converging toward said impeller to define a circular opening of a diameter intermediate those of said concentric circles and large enough to expose an appreciable length of the vanes effective for beating out bubbles of gas or vapor from the fuel.

8. A booster pump for attachment to an underside of a fuel tank, said pump comprising an impeller disc having radially extending vanes on the inlet face of said disc, said vanes being tapered at their inner ends toward said disc face and with their inner and outer ends lying in circles concentric with the disc axis, and a plate overlying said impeller on the tank side with its lower face in closely spaced relation to said vanes and having a shallow throat converging toward said impeller to define a circular opening of a diameter intermediate the diameters of said circles.

9. A booster pump for attachment to an underside of a fuel tank, said pump comprising an impeller disc having radially extending vanes on the inlet face of said disc, said vanes being tapered at their inner ends toward said disc face and with their inner and outer ends lying in circles concentric with the disc axis, and a plate overlying said impeller on the tank side with its lower face in closely spaced relation to said vanes and having a shallow throat converging toward said impeller to define a circular opening of a diameter intermediate the diameters of said circles, the convergency of said throat and the taper of said vanes being approximately continuations of each other.

10. In combination with a lower or side wall of a fuel tank, a booster pump comprising a casing secured to said wall and about an opening formed therein, a driven impeller mounted with its axis perpendicular to said wall, said impeller having a circular flange with upstanding ribs radiating out from a circle near said axis, and a plate mounted in said tank wall opening so as to overlie and be closely spaced from said ribs and having a shallow throat converging from said tank toward said axis to define an opening of substantially greater diameter than the circle defined by the inner ends of said ribs.

11. A pump and motor unit comprising a motor, a casing therearound having an open mouthed outwardly flanged head portion defining a pump volute chamber and a central passageway, a motor shaft extending from the motor through said passageway, a pump impeller on said shaft arranged to impel fluid in the open mouth of said head portion into the volute chamber, a throat ring in the mouth of the head portion overlying the volute chamber and defining an inlet to the impeller, and said flange of the head portion adapted to be attached to the wall of a tank to fixedly connect the entire unit to a tank.

12. A device for discharging fully liquid material, such as volatile fuel, from a source of liquid material, which comprises a pump having a portion defining a relatively large inlet throat communicating with said source, an impeller assembly adjacent said pump portion, vane portions on the impeller assembly underlapping said pump portion in closely spaced relation and defining walls of open-ended liquid flow pumping channels, and additional vane portions of appreciable length on the impeller assembly in open communication with the source of liquid and adjacent to and in communication with the inlet throat of said pump portion in the path of liquid flow to the pumping channels effective for acting on the liquid material before it becomes confined in the channels to agitate the material and beat out bubbles of gas and vapor therefrom.

13. A device for discharging fully liquid material, such as volatile gasoline, from a source of liquid material, which comprises a pump having a portion defining a relatively large inlet throat communicating with said source, an impeller assembly adjacent said pump portion including a disk spanning the inlet opening of the throat and underlapping said pump portion around the periphery thereof, vane portions on the outer peripheral portion of the disk underlapping said pump portion in closely spaced relation and defining with the disk and pump portion open-ended liquid flow pumping channels, and additional vane portions of appreciable length on the impeller assembly in open communication with the source of liquid and closely adjacent to and in communication with the inlet throat in the path of liquid flow to the pumping channels effective for acting on the liquid material before it becomes confined in the channels to agitate the material and beat out bubbles of gas and vapor therefrom, whereby said channels discharge fully liquid material.

14. A device adapted for discharging fully liquid material, such as volatile fuel, from a source of liquid material, which comprises a pump having a pump chamber and a relatively large inlet throat communicating with said source, an impeller having vanes for pumping liquid from the inlet throat to the chamber, and for agitating the liquid, said vanes for pumping liquid defining walls of open-ended pumping channels having closed perimeters discharging into the pump chamber, said inlet throat flaring outwardly on the inlet side thereof and being directed toward the peripheral portions of the vanes for agitating, said vanes for agitating having an appreciable length in open communication with the source of liquid and adjacent to and in communication with the relatively large inlet throat in the path of liquid flow to the pumping channels and being effective for acting on the liquid before it becomes confined in the pumping channels to beat out bubbles of gas and vapor therefrom.

RUSSELL R. CURTIS.